United States Patent
Suwa et al.

(10) Patent No.: US 7,940,981 B2
(45) Date of Patent: May 10, 2011

(54) METHOD AND APPARATUS FOR GENERATING PROJECTING PATTERN

(75) Inventors: Masaki Suwa, Kyoto (JP); Daisuke Mitsumoto, Kyoto (JP); Yoshinobu Asokawa, Nara (JP)

(73) Assignee: OMRON Corporation, Kyoto (JP)

( * ) Notice: Subject to any disclaimer, the term of this patent is extended or adjusted under 35 U.S.C. 154(b) by 1117 days.

(21) Appl. No.: 11/482,499

(22) Filed: Jul. 7, 2006

(65) Prior Publication Data

US 2007/0009150 A1    Jan. 11, 2007

(30) Foreign Application Priority Data

Jul. 8, 2005    (JP) ................................ 2005-200927

(51) Int. Cl.
*G06K 9/00* (2006.01)
*G06K 9/36* (2006.01)
*H04N 7/18* (2006.01)
*G06T 15/00* (2006.01)

(52) U.S. Cl. ........ 382/154; 382/181; 382/237; 382/253; 348/135; 345/419

(58) Field of Classification Search .................. 382/100, 382/154, 218, 181, 108, 232, 254, 312, 314, 382/151, 162, 168, 173, 276, 237, 253; 530/307; 365/230.03, 230.01; 711/121; 930/60, DIG. 660, 930/DIG. 821, DIG. 661, DIG. 671, DIG. 670; 257/E27.081, E27.085, E27.001, E27.009; 548/335.5; 514/235.8, 275; 544/35, 122, 544/330, 331, 332; 345/419; 348/135

See application file for complete search history.

(56) References Cited

U.S. PATENT DOCUMENTS

| | | | | |
|---|---|---|---|---|
| 4,030,342 A | * | 6/1977 | Bond et al. | 73/627 |
| 4,871,252 A | * | 10/1989 | Beni et al. | 356/457 |
| 5,442,147 A | * | 8/1995 | Burns et al. | 178/18.09 |
| 6,404,484 B1 | | 6/2002 | Sogawa | |

FOREIGN PATENT DOCUMENTS

JP    2001-147110    5/2001

OTHER PUBLICATIONS

Jordi Pages et al.; "Overview of coded light projection techniques for automatic 3D profiling"; IEEE International conference on Robotics and Automation, ICRA 2003, pp. 133-138, Taipei, Taiwan, Sep. 14-19, 2003 (6 pages).

Shun'ichi Kaneko et al.; "Measuring 3-D Shape of Borehole Wall Using Stereo Vision with Increment Sign Correlation"; JSPE Journal, vol. 67, No. 1, pp. 81-25; 2001 (in Japanese with translation) (15 pages).

* cited by examiner

*Primary Examiner* — Sheela C Chawan
(74) *Attorney, Agent, or Firm* — Osha • Liang LLP

(57) ABSTRACT

A pattern generating apparatus includes a sequence generating unit and an image data generating unit. The sequence generating unit generates a sequence formed by terms having M-value numeric values. The image data generating unit generates the image data by converting each numeric value of the sequence into a gray-level value according to each numeric value, and the sequence is generated by the sequence generating unit. The sequence generating unit generates the sequence such that vectors expressed by sub-sequences have different directions for the sub-sequence constituting the generated sequence.

18 Claims, 12 Drawing Sheets

Fig. 4

| 150 | 50 | 50 | 150 | 50 | 150 | 150 | 150 | 50 |
|-----|----|----|-----|----|-----|-----|-----|----|
| 150 | 50 | 50 | 150 | 50 | 150 | 150 | 150 | 50 |
| 150 | 50 | 50 | 150 | 50 | 150 | 150 | 150 | 50 |
| 150 | 50 | 50 | 150 | 50 | 150 | 150 | 150 | 50 |
| 150 | 50 | 50 | 150 | 50 | 150 | 150 | 150 | 50 |

| | Pattern | State in which pattern is projected to measurement target | Measurement result |
|---|---|---|---|
| No pattern projection |  |  |  |
| Use of stripe pattern |  |  |  |
| Use of pattern of the embodiment |  |  |  |

METHOD AND APPARATUS FOR GENERATING PROJECTING PATTERN

BACKGROUND OF THE RELATED ART

1. Field of the Invention

The present invention relates to generation of pattern image data projected onto a target in a stereo method.

2. Description of the Related Art

Conventionally there is well known "stereo method." In the stereo method, three-dimensional shape information on the measurement target or distance information to the measurement target is determined using two images which are obtained by imaging the measurement target from two different positions. In the stereo method, a depth distance is computed based on a triangulation principle by utilizing imaging position shift (parallax) of the measurement target which is generated between two taken images.

In the stereo method, in order to determine the parallax, it is necessary to search points (corresponding points) which correspond to each other in the taken images. The search is called "stereo correspondence problem." Window-based matching can be cited as an example of the well-known stereo correspondence problem technique.

Process contents of the window-based matching will be described below with reference to FIG. 12.

First one of the taken images is set at a first image $G_1$. In the first image $G_1$, a reference pixel $P_1$ is set to recognize a window $W_1$ corresponding to the reference pixel $P_1$. The window $W_1$ is a pixel region including the reference pixel $P_1$ and a set of pixels having predetermined positional relationships with respect to the reference pixel $P_1$. In FIG. 12, the window $W_1$ is the pixel region which is formed by three-by-three pixels centered around the reference pixel $P_1$.

Then, the other taken image is set at second image $G_2$, and one pixel located in the second image $G_2$ is set at a target pixel $P_2$ to recognize a window $W_2$ corresponding to the target pixel $P_2$. The window $W_2$ is a pixel region including the reference pixel $P_2$ and a set of pixels having predetermined positional relationships, determined in the same way as the window $W_1$, with respect to the reference pixel $P_2$.

A normalized correlation function C expressed by a formula (1) is computed using brightness values $I_1(i)$ of the pixels constituting the window $W_1$ and brightness values $I_2(i)$ of the pixels constituting the window $W_2$.

[Formula 1]
$$C = \frac{\left(\sum_{i=0}^{W-1} I_1(i)I_2(i) - \frac{1}{W}\sum_{i=0}^{W-1} I_1(i) \sum_{i=0}^{W-1} I_2(i)\right)}{\left(\sum_{i=0}^{W} I_1(i)I_1(i) - \frac{1}{W}\sum_{i=0}^{W-1} I_1(i)\sum_{i=0}^{W-1} I_1(i)\right)^{\frac{1}{2}} \left(\sum_{i=0}^{W-1} I_2(i)I_2(i) - \frac{1}{W}\sum_{i=0}^{W-1} I_2(i)\sum_{i=0}^{W-1} I_2(i)\right)^{\frac{1}{2}}}$$

$I_1(i)$, $I_2(i)$: Brightness values in pixel position of cameras 1 and 2

W: Window size

In the formula (1), "i" is an identification number for identifying the pixels constituting the windows $W_1$ and $W_2$ by the positions of the pixels, and the identification number is set based on the same rule between the windows $W_1$ and $W_2$. That is, in the two pixels having the same identification number between the windows $W_1$ and $W_2$, the position in the window $W_1$ coincides with the position in the window $W_2$.

In the formula (1), "W" is the number of pixels (window size) constituting each of the windows $W_1$ and $W_2$. In FIG. 12, "W" is 3×3=9.

The normalized correlation function C computed by the formula (1) is a value which indicates similarity (ranging from −1 to 1) of the target pixel $P_2$ to the reference pixel $P_1$. A possibility of a correspondence correlation is increased between the pixels, as the value of the normalized correlation function C is increased (as the value is brought close to 1).

Therefore, the pixels of the second image $G_2$ are sequentially set at the target pixel $P_2$, the normalized correlation function C concerning each pixel is computed by the same process, and the pixel whose normalized correlation function C becomes the maximum is regarded as the pixel corresponding to the reference pixel $P_1$ and set at the corresponding point.

The technique using the formula (1) is called normalized correlation method, and the normalized correlation method is a typical technique for the stereo correspondence problem.

In the normalized correlation method, even if the brightness values $I_1(i)$ (i=1 to w) are changed to $I_1'(i)=\alpha I_1(i)+\beta$ ($\alpha$ and $\beta$ are a real number), the same result can be obtained. That is, the value of the normalized correlation function C computed from the brightness values $I_1(i),I_2(i)$ (i=1 to w) becomes equal to the value of the normalized correlation function C' computed from the brightness values $I_1'(i),I_2(i)$.

Therefore, even if linear shift is generated between the brightness values in the images due to a difference in output characteristics between a camera 1 taking the first image $G_1$ and a camera 2 taking the second image $G_2$ or the like, the appropriate stereo correspondence problem can be performed by absorbing the linear shift.

The window-based matching is a technique of identifying the correspondence correlation based on distribution characteristics of the pixel brightness value. Therefore, for example, as in the case where the measurement target is an object having a monochrome surface, when the measurement target has an even surface brightness distribution to hardly generate the change in brightness value in the taken image, it is difficult to perform the stereo correspondence problem.

On the other hand, a technique for solving the above problem describes projecting a predetermined projecting pattern onto the surface of the measurement target to put the pattern on the surface of the measurement target (see Japanese Patent Application Laid-Open Nos. 2001-91247 and 2001-147110 and Jordi Pages, et. al., "Overview of coded light projection techniques for automatic 3D profiling" IEEE International Conference on Robotics and Automation, ICRA2003, pp. 133-138, Taipei, Taiwan, 14-19th September 2003).

Specifically, Japanese Patent Application Laid-Open No. 2001-91247 discloses a technique of using a random pattern in which brightness blocks having predetermined brightness gray levels are randomly arranged (namely, there is no regularity in the brightness change).

Japanese Patent Application Laid-Open No. 2001-147110 discloses a technique of using a non-periodic projecting pattern which has no periodicity in a dot size, line length, a line thickness, a position, density, and the like based on random numbers or normal random numbers. Japanese Patent Application Laid-Open No. 2001-147110 also discloses a technique of determining whether the projecting pattern is appropriate by evaluating the generated projecting pattern with a pattern change rate, a feature quantity, s dispersion value, pattern matching, and the like.

Page, et al. discloses various projecting patterns such as a projecting pattern based on an M-sequence pseudo-random sequence, a binary code pattern including black and white, and a projecting pattern expressed by gray scale or color.

In FIG. 12, a plane formed by a measuring point MP, an imaging point IP1 of the camera 1, and an imaging point IP2 of the camera 2 is called epipolar plane, and a straight line connecting the measuring point MP and each of the imaging points IP1 and IP2 is called epipolar line. When the positional relationship between the camera 1 and the camera 2 is already known, a direction of the epipolar line connecting the measuring point MP and the imaging point IP1 is determined on the image $G_2$. Therefore, as is well known, the stereo correspondence problem can be performed only on the epipolar line.

However, in the conventional techniques using projecting patterns, for example, assuming that the window is formed by the pixel region having one-by-three pixels, sometimes a vector corresponding to one window becomes (50,43,23) in the taken image while a vector corresponding to the other window becomes (100,86,46).

Even if the linear shift is generated between the brightness values in the taken images, the linear shift can be absorbed using the normalized correlation function C (formula (1)). At the same time, in the normalized correlation function C, there is a risk that the stereo correspondence problem is faultily performed between the brightness values in the taken images, when a scalar multiplication relationship is generated between the brightness values in the taken images using the conventional projecting pattern.

This corresponds not only to the case where the normalized correlation function C (formula (1)) is used but to the case where an increment sign correlation is performed (see T. Kaneko, et. al., "Stereoscopic measurement of borehole wall three-dimensional shape by increment sign correlation" Journal of the Japan Society for Precision Engineering, vol. 67, no. 1, pp. 81-85, 2001).

Japanese Patent Application Laid-Open No. 2001-147110, proposes that after the pattern is projected to take the image, the taken image is evaluated. When the taken image does not correspond to a reference, another pattern is produced, and the projection, taking the image, and the evaluation are performed again. Therefore, the pattern appropriate pattern is not always generated from the beginning.

SUMMARY

In general herein is provided an apparatus and technique for generating and capturing stereo projection patterns.

A first aspect of the invention provides a pattern generating apparatus which generates image data of a pattern projected to a measurement target, the pattern generating apparatus includes a sequence generating device which generates a sequence formed by terms having M-value (where M is an integer greater than or equal to two) numeric values; and an image data generating device which generates the image data by converting each numeric value of the sequence into a gray-level value according to each numeric value, the sequence being generated by the sequence generating device, wherein the sequence generating device generates the sequence such that vectors expressed by sub-sequences have different directions for the sub-sequence constituting the generated sequence, the sub-sequence having a predetermined length.

In one embodiment according to the invention, the sequence generating device generates the sequence formed by the terms having M-value numeric values. For example, the M-value numeric value becomes the two-level numeric values of "0" and "1" (binary expression) in the case of M=2, and the M-value numeric value becomes the four-level numeric values of "00", "01", "10", and "11" (binary expression) in the case of M=4, etc.

In another aspect of the invention, a projecting apparatus is formed by including a pattern generating apparatus according to one or several embodiments of the invention and a projecting device which projects a pattern of the image data generated by the pattern data generating apparatus to a measurement target.

In another aspect of the invention, a distance measuring apparatus is formed by including a projecting apparatus according to one or several embodiments of the invention and a stereo imaging device which takes an image of the measurement target to which the pattern is projected by the projecting apparatus.

In yet another aspect of the invention, a three-dimensional shape measuring apparatus is formed by including a projecting apparatus according to one or several embodiments of the invention and a stereo imaging device which takes an image of the measurement target to which the pattern is projected by the projecting apparatus.

In one embodiment according to the invention, a pattern forming apparatus is formed by including a pattern generating apparatus according to one or several embodiments of the invention and an exposure device which performs exposure according to the pattern provided by the pattern generating apparatus.

Another aspect of the invention provides a method for generating a pattern for generating image data of a pattern projected onto a target, the pattern generating method includes a sequence generating process of generating a sequence formed by terms having M-value numeric values; and an image data generating process of generating the image data by converting each numeric value of the sequence into a gray-level value according to each numeric value, the sequence being generated by the sequence generating process, wherein the sequence is generated in the sequence generating process such that vectors expressed by sub-sequences have different directions for the sub-sequence constituting the generated sequence, the sub-sequence having a predetermined length.

In another aspect of the invention, an optical filter production uses the pattern generating method and pattern forming method according to one or several embodiments, in producing an optical filter.

An optical filter according to another embodiment of the invention is an optical filter having a pattern generated by a pattern generating method according to any of the embodiments of the invention.

BRIEF DESCRIPTION OF THE DRAWINGS

FIG. 4 shows an example of image data generated by the process shown in the flowchart of FIG. 2;

DETAILED DESCRIPTION OF THE PREFERRED EMBODIMENTS

Figure 1:
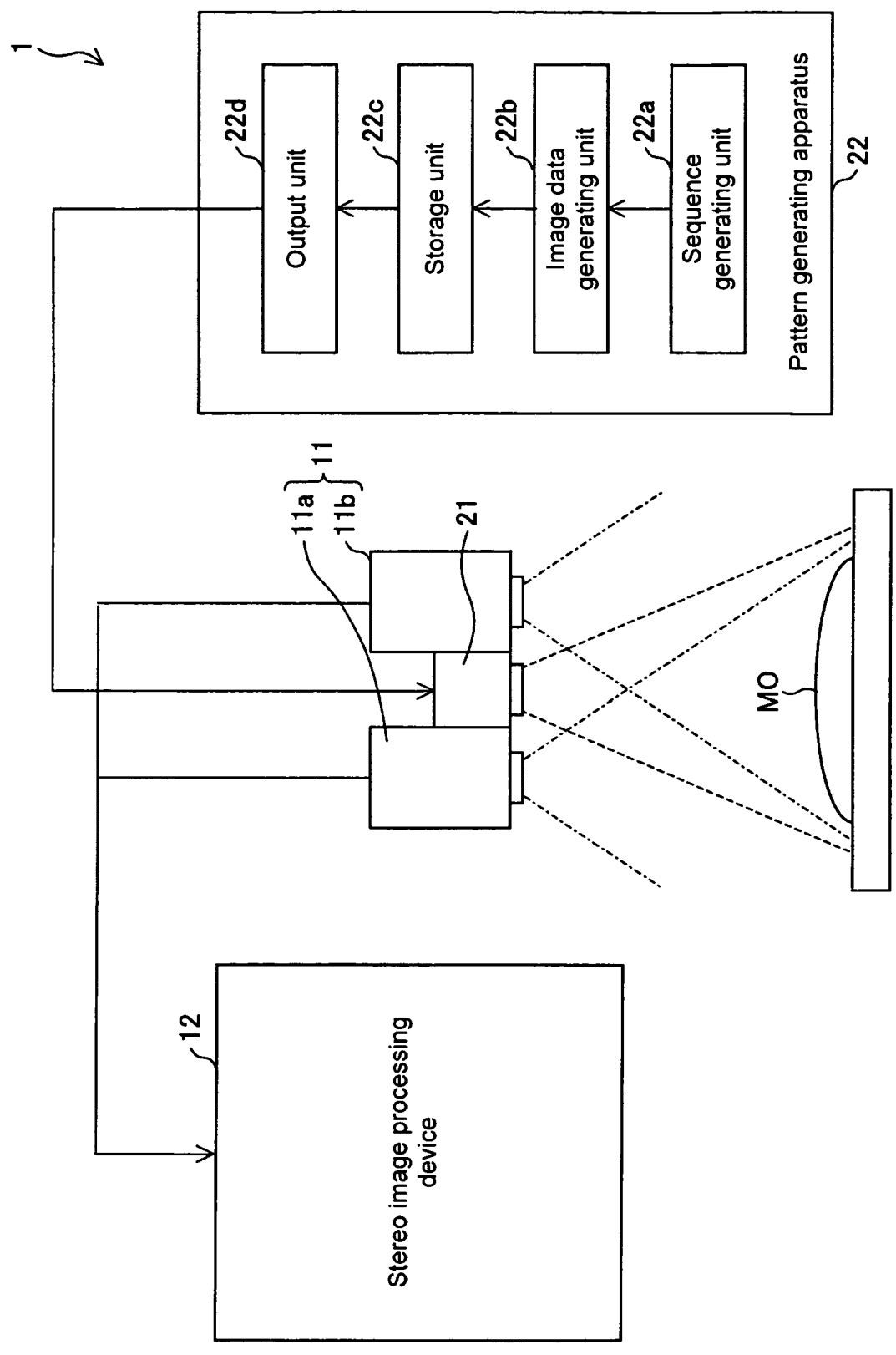
FIG. 1 shows a block diagram of a configuration of a three-dimensional shape measuring apparatus according to a first embodiment of the invention.

A configuration of a three-dimensional shape measuring apparatus 1 of the first embodiment will be described with reference to the block diagram of FIG. 1. The three-dimensional shape measuring apparatus 1 is an apparatus which measures a three-dimensional shape of a measurement target MO using the stereo method.

The three-dimensional shape measuring apparatus 1 includes a stereo camera 11, a stereo image processing device 12, a projector 21, and a pattern generating apparatus 22.

The stereo camera 11 includes a first camera 11a and a second camera 11b. The pieces of taken image data are generated by taking the measurement target. MO from different positions with the first camera 11a and the second camera 11b.

The stereo image processing device 12 computes the three-dimensional shape of the measurement target MO by the stereo method in which the pieces of image data taken by the first and second cameras 11a and 11b are used. Specifically, the stereo image processing device 12 utilizes imaging position shift (parallax) of the measurement target MO, which is generated between the two taken images by using the pieces of image data, to compute a depth distance based on a triangulation principle, and the stereo image processing device 12 computes the three-dimensional shape of the measurement target MO. In order to determine the parallax, the stereo image processing device 12 performs the stereo correspondence problem with the window-based matching.

The stereo camera 11 and the stereo image processing device 12 are well known, so that the description of the detailed configuration and process contents will not be repeated.

For example, the projector 21 is formed by a liquid crystal projector. The projector 21 functions as a projecting apparatus which converts pattern image data into light having brightness according to the pattern to project a pattern onto the measurement target MO. The pattern image data is generated by the pattern generating apparatus 22.

The pattern is one which is projected onto the measurement target MO such that the surface of the measurement target MO has a predetermined brightness distribution (the surface of the measurement target MO is coded) in order to adequately perform the stereo correspondence problem with the window-based matching in the stereo image processing device 12.

That is, the window-based matching is a technique of determining the correspondence correlation between the two taken images based on the pixel brightness value distribution characteristics. Therefore, the surface brightness distribution of the measurement target MO is even in the case where the measurement target MO has the monochrome surface, and the window-based matching is hardly performed in the case where the change in brightness value is hardly generated in the taken image. In order to adequately perform the window-based matching even in this case, the pattern is projected onto the surface of the measurement target MO such that the surface of the measurement target MO has a predetermined brightness distribution.

The pattern generating apparatus 22 generates image data of the pattern to supply the image data to the projector 21. The pattern generating apparatus 22 includes a sequence generating unit 22a, an image data generating unit 22b, a storage unit 22c, and an output unit 22d. The sequence generating unit 22a generates a sequence $\{a_n\}$ having terms of M (M is an integer more than 1) numeric values. The image data generating unit 22b generates the image data of the pattern by converting each numeric value (also referred to as each term or code) $a_n$ of the sequence $\{a_n\}$ generated by the sequence generating unit 22a into a gray-level value corresponding to each numeric value. The image data generated by the image data generating unit 22b is stored in the storage unit 22c. The output unit 22d outputs the image data stored in the storage unit 22c to the projector 21.

In the following description, it is assumed that each numeric value an is a numeric value of a binary number. For example, the M numeric value becomes the two numeric values of "0" and "1" in the case of M=2, and the M numeric value becomes the four numeric values of "00", "01", "10", and "11" in the case of M=4.

Then, process contents performed by the sequence generating unit 22a and image data generating unit 22b will be described with reference to a flowchart of FIG. 2.

The sequence generating unit 22a performs parameter initial setting (Step S1), and the sequence generating unit 22a sets counters i, j, and n used in computation at an initial value of 1 (Step S2).

In the initial setting of Step S1, the initial setting is performed to the parameters used to generate the sequence $\{a_n\}$. The parameters to which the initial setting is performed include a gray-level bit N, a window width W, an initial value $C_1$ of a candidate value, and a desired code length L.

The gray-level bit N is a bit number corresponding to the number of gray levels constituting the pattern. For example, 2¹=2 gray levels in the case of N=1 bit, and 2²=4 gray levels in the case of N=2 bits. The window width W is a window width (the number of pixels in a row direction) which is assumed in performing the window-based matching. The desired code length L is the number of necessary terms of the generated sequence $\{a_n\}$, and the desired code length L corresponds to a pattern width (the number of pixels in the row direction).

In setting the parameters, the sequence generating unit 22a performs the setting so as to obtain a relationship of $L<<2W\times N$. For example, the window width W and the desired code length L are set according to the state in which the stereo correspondence problem is actually performed (a size of the measurement target, a distance between the measurement target and the camera, and the like), and the window width W and the desired code length L are inputted to the sequence generating unit 22a. The bit number N can be set so as to obtain the relationship of $L<<2W\times N$ using the window width W and the desired code length L. At this point, how much 2W×N should be larger than L depends on experience. However, the increase in computation amount caused by setting the bit number of the gray-level bit N at the excessive large number can be avoided when the relationship of L<<2 W×N is set as a rough guide.

A candidate value $C_i$ is a numeric value which is used in the course of generating the sequence $\{a_n\}$, and the candidate value $C_i$ is a numeric value of a (N×W)-figure binary number in which W N-bit numeric values are arranged and regarded as the numeric value of the binary number. For example, the candidate value $C_i$ is "xxx" (x is 0 or 1) in the case of N=1 and W=3, and the candidate value $C_i$ is "xxxxxx" in the case of N=2 and W=3. The candidate value $C_i$ can also be regarded as a w-dimensional vector having elements of N-bit numeric values. For example, the candidate value $C_i$ can be regarded as a vector (x,x,x) in the case of N=1 and W=3, and the candidate value $C_i$ can be regarded as a vector (xx,xx,xx) in the case of N=2 and W=3.

An initial value C1 of the candidate value is an arbitrary candidate value $C_i$ set in starting the computation. An adopted value $E_n$ is a candidate value $C_i$ which is adopted by satisfying predetermined conditions.

A sequence $\{F_k\}$ (k ranges from 0 to 2 NW·1) of a flag $F_k$ is previously prepared in the sequence generating unit 22a. The flag $F_k$ corresponds to the candidate value $C_i$ ($F_k$ corresponds to $C_i$ in the case of k=$C_i$), and the flag $F_k$ indicates whether a process of Step S5 is already performed ($F_k$=1) or not ($F_k$=0) to the corresponding candidate value $C_i$.

After the parameter initial setting (Step S1) and the counter initialization (Step S2), it is determined whether a flag $F_{Ci}$ is 0 or not (Step S3). When the flag $F_{Ci}$ is 0 (YES in Step S3), the flag $F_{Ci}$ is set at 1 (Step S4), and the flow goes to Step S5. When the flag $F_{Ci}$ is not 0 (NO in Step S3), the flow goes to Step S6 while neglecting Steps S4 and S5.

In Step S5, when the candidate value $C_i$ is regarded as the vector, it is determined whether the direction of the vector has the uniqueness for the adopted value $E_n$. What the direction of the vector has the uniqueness means that the vector has the direction different from those of other vectors in a predetermined set of vectors. Therefore, in Step S5, it is determined whether the vector of the candidate value $C_i$ differs from the vector corresponding to each of the already obtained adopted values $E_n$ in the direction.

When the direction of the vector of the candidate value $C_i$ does not have the uniqueness (NO in Step S5), the flow goes to Step S6, and it is determined whether the flag $F_k$ which is set at 0 still exists (Step S6).

When the flag $F_k$ which is set at 0 still exists (YES in Step S6), the candidate value $C_i$ is updated by incrementing the candidate value $C_i$ by 1 (Steps S8 and S9), and the process from Step S3 are repeated. The repetition is set so as not to exceed ($2^N$-1) times (Steps S7 and S10).

Because the number of figures is determined by the (N×W) figures in the candidate value Ci, sometimes overflow is generated in the update. In this case, the last (N×W) figures can be set at the new candidate value $C_i$ after the update. That is, the result that 1 is added to the candidate value $C_i$ is divided by $2^{WN}$, and a remainder of the quotient may be set at the new candidate value $C_i$.

In the processes of Steps S3 to S10, when the candidate value $C_i$ in which the direction of the vector has the uniqueness is obtained (YES in Step S5), the candidate value $C_i$ is adopted as the adopted value $E_n$ (Step S11). It is determined whether a number n of the adopted value $E_n$ reaches L (Step S12). When the number n does not reach L (NO in Step S12), it is determined whether the flag $F_k$ which is set at 0 still exists (Step S13). When the flag $F_k$ which is set at 0 still exists (YES in Step S13), the counter n is incremented (Step S14), the candidate value $C_i$ is updated by multiplying candidate value $C_i$ by $2^N$ (Steps S15 and S16), and the counter j is initialized at 1 (Step S17) to repeat the processes from Step S3.

For the update of the candidate value $C_i$, as in the case of Step S9, the last (N×W) figures can be set at the new candidate value $C_i$ after the update when the overflow is generated. That is, the result that the candidate value $C_i$ is multiplied by $2^N$ is divided by $2^{WN}$, and a remainder of the product may be set at the new candidate value $C_i$.

On the other hand, when the candidate value $C_i$ does not have the uniqueness even if the update of Step S9 is repeated ($2^N$-1) times (NO in Step S7), the flow goes to Step S15, and the process is performed from Step S15.

Thus, the candidate value $C_i$ having the uniqueness is adopted as the adopted value $E_n$ while updated. When the number n of the adopted value $E_n$ reaches L, the last N bits of each adopted value $E_n$ is set at each term an of the sequence $\{a_n\}$ to generate the sequence $\{a_n\}$ (Step S18).

When the flag $F_k$ set at 0 does not exist while the number n of the adopted value $E_n$ does not reach L (NO in Steps S6 and S13), even if the processes are further continued, there is no chance that the new adopted value is obtained. Therefore, the flow goes to Step S18 in order to avoid falling in an infinite loop. In this case, the generated sequence $\{a_n\}$ does not satisfy the necessary number of terms. This is attributed to the fact that the sufficiently large 2W×N is not set at L in the relationship of L<<2W×N, so that the gray-level bit N and/or the window width W can be reset at the lager value to perform the processes from the beginning again.

The processes of Steps S1 to S18 are performed by the sequence generating unit 22a.

Then, the image data generating unit 22b converts the value of each term $a_n$ of the sequence $\{a_n\}$ into the gray-level value according to the value of each term (Step S19). Any conversion may be adopted in Step S19 as long as only converting the different values into the same gray-level value can be avoided. When the two gray-level values are set too much close to each other, because it is difficult to perform a process of distinguishing the two gray-level values from each other in the taken image (threshold process), it is desirable that the gray-level values be set in a dispersive manner to some extent.

In the sequence $\{a_n\}$ obtained in the above-described way, in consideration of W continuous sub-sequences constituting the sequence $\{a_n\}$, the vector expressed by an arbitrary sub-sequence differs from the vectors expressed by other arbitrary sub-sequences in the direction. That is, the vector has the uniqueness.

In the image data which is obtained by converting the value of each term an of the sequence $\{a_n\}$ into the gray-level value corresponding to each value, the direction of the vector expressed by the gray-level value of the pixel column corresponding to the window width W has the uniqueness, and the vector has no relationship of the scalar multiplication with other vectors. Therefore, in the stereo image processing device 12, the risk that the stereo correspondence problem is faultily performed is decreased and the correct stereo correspondence problem is realized when the window-based matching is performed using the normalized correlation function.

This can be applied not only to the use of the normalized correlation function but to the use of other evaluation functions (evaluation function absorbing the brightness linear shift between the stereo images) such as an increment sign correlation function.

The image data generating unit 22b generates a matrix image data using one-line image data obtained in the above-described way (Step S20).

In one of the techniques of generating the matrix image data, the one-line image data is directly arranged in plural columns. Therefore, the obtained image data can be utilized in the stereo correspondence problem in consideration of the epipolar line.

In the stereo method, the observation point and each imaging point of the stereo camera 11 form a triangle (epipolar plane), so that the stereo correspondence problem can be performed on one side (epipolar line) of the triangle. Accordingly, because the direction of the epipolar line can also be learned by previously determining the positional relationship between the first and second cameras 11a and 11b in the stereo camera 11, the stereo correspondence problem can be performed in the direction of the epipolar line.

Because the uniqueness of the vector direction is ensured in the row direction of the image data, the stereo correspondence problem can correctly be performed in the row direction. Accordingly, the row direction is adapted to the epipolar line, which allows the stereo correspondence problem to be performed as a whole.

In this case, the one-line image data may directly be used without arranging the one-line image data in the plural columns.

In another technique of generating the matrix image data, the one-line image data is arranged in the plural columns while shifted by the window width W in the row direction (an overflowing portion onto one end portion side by shifting the one-line image data is added to the other end portion side). In the obtained image data, assuming that a square matrix includes the numbers of row and columns corresponding to the window width W, an arbitrary square matrix has no relationship of the scalar multiplication with other square matrixes. Accordingly, because the two-dimensional stereo correspondence problem can be performed, the stereo correspondence problem can correctly be performed, even if the epipolar line is not considered as described above, or even if an error is considered to some extent in the epipolar line.

In the specification, "row direction" and "column direction" simply mean direction orthogonal to each other in the matrix array. That is, the row direction and the column direction may be correspond to a horizontal direction and a vertical direction of the image respectively, or the row direction and the column direction may be correspond to the vertical direction and the horizontal direction of the image respectively.

Figure 2:
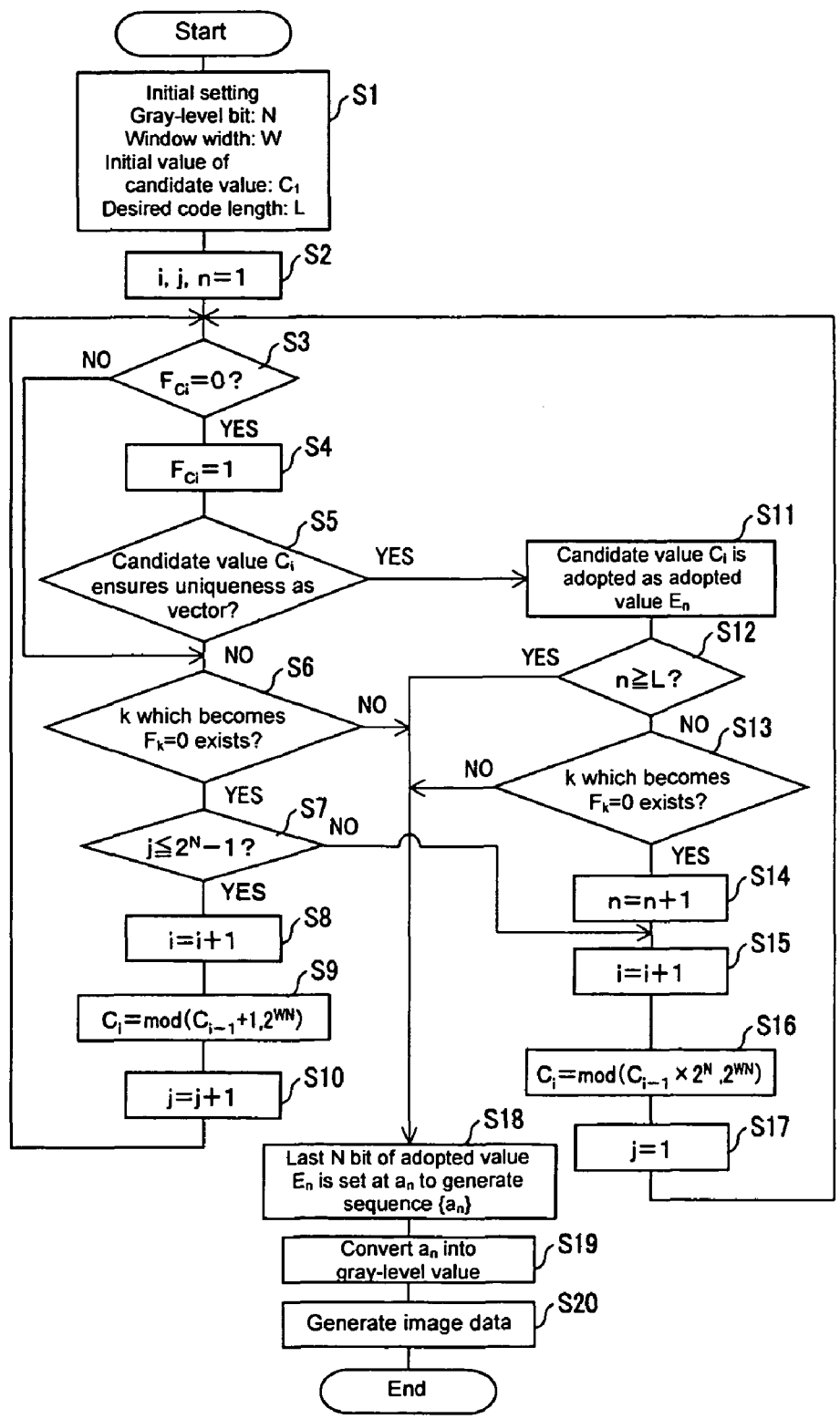
FIG. 2 shows a flowchart of operations by a sequence generating unit and an image data generating unit of the pattern generating apparatus in the three-dimensional shape measuring apparatus of FIG. 1.
Figure 3:
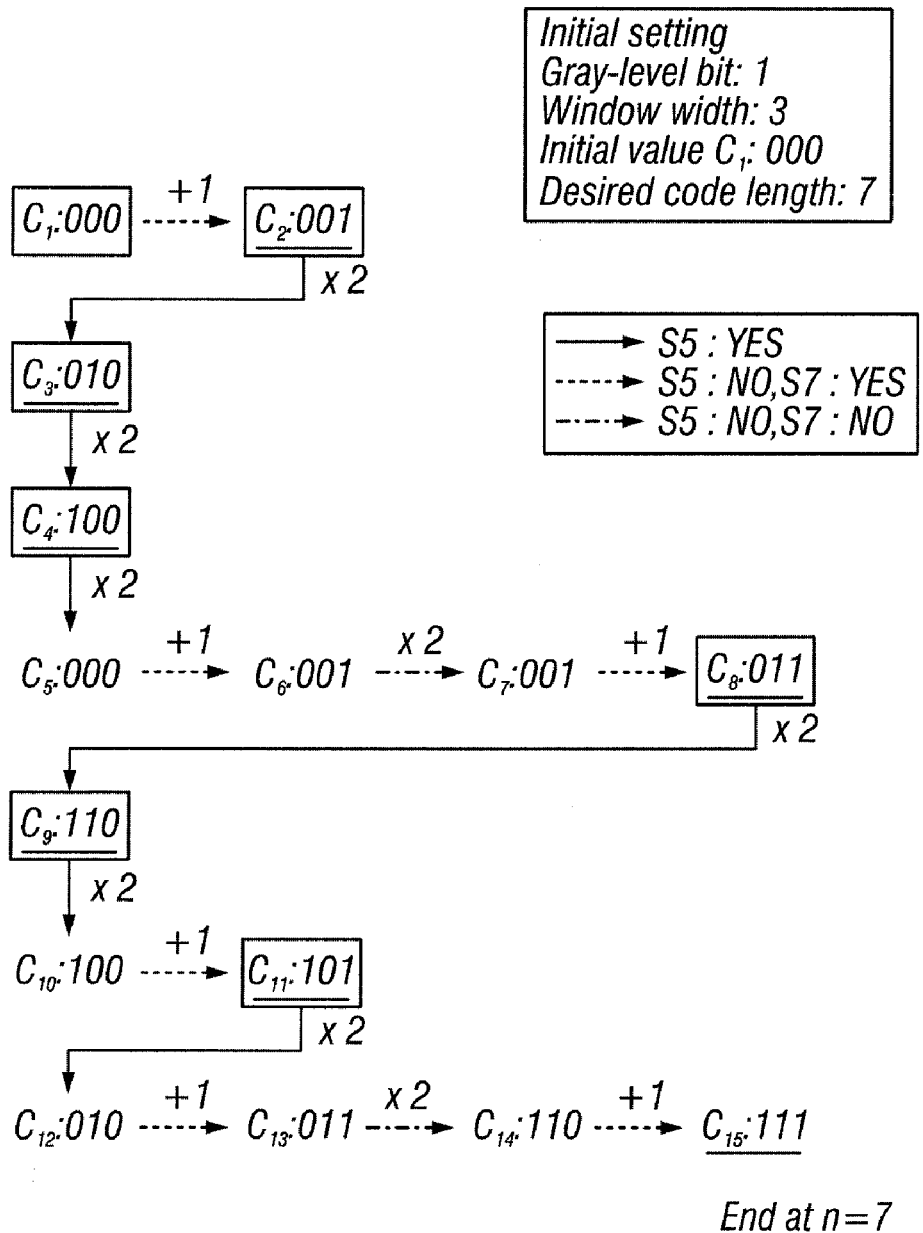
FIG. 3 shows an example of process contents shown in the flowchart of FIG. 2.

FIG. 3 shows an example of the above process contents with the specific numeric values. In FIG. 3, it is assumed that the gray-level bit N is set at 1, the window width W is set at 3, and the initial value C1 of the candidate value is set at 000. The process contents of FIG. 3 will be described below with reference to the flowchart of FIG. 2.

In FIG. 3, the candidate value $C_1$=000 is regarded as the vector (0,0,0), and it can be thought that the vector (0,0,0) has the same direction as an arbitrary vector. Therefore, it is recognized that the vector (0,0,0) does not have the uniqueness, and the vector (0,0,0) is not adopted as the adopted value (NO in Step S5). The candidate value $C_2$=001 is regarded as the vector (0,0,1) obtained in Step S9 through Steps S7 and S8, and a vector having the same direction as the vector (0,0,1) is not adopted as the adopted value yet (YES in Step S5), so that the candidate value $C_2$=001 is adopted as the adopted value $E_1$ (Step S11). Then, the candidate value $C_3$=010 is regarded as the vector (0,1,0) obtained in Step S16 through Steps S12 to S15, and a vector having the same direction as the vector (0,1,0) is not adopted as the adopted value yet (YES in Step S5), so that the candidate value $C_3$=010 is adopted as the adopted value $E_2$ (Step S11). Similarly, the candidate value $C_4$=100 is adopted as the adopted value $E_3$ in Step S8. Then, the candidate value $C_6$=001 is regarded as the vector (0,0,1) obtained in Step S16 through Steps S12 and S15, and the vector (0,0,1) does not have the uniqueness because the vector (0,0,1) has the same direction as the adopted value $E_1$. Therefore, the candidate value $C_6$=001 is not adopted as the adopted value (NO in Step S5).

The candidate values $C_2$, $C_3$, $C_4$, $C_8$, $C_9$, $C_{11}$, and $C_{15}$ are adopted as the adopted values $E_1$ to $E_7$ respectively by making the above determination.

For the determination in Step S5 (determination of the uniqueness of the vector direction), in the case of N=1, the numeric value obtained as the adopted value $E_n$ is expressed in decimal numbers, and the determination can be made based on whether the numeric value is already expressed.

The sequence $\{a_n\}$=$\{1,0,0,1,0,1,1\}$ is obtained by sequentially setting low-order N (=1) bits of the adopted values $E_1$ to $E_7$ at terms an of the sequence {an}.

For example, the values "1" and "0" of the terms an in the obtained sequence $\{a_n\}$=$\{1,0,0,1,0,1,1\}$ are converted into gray-level values of "150" and "50" respectively, which allows the image data {150,50,50,150,50,150,150} to be obtained. In the image data, the directions of the vectors (150,50,50), (50,50,150), (50,150,50), (150,50,150), and (50,150,150) expressed by the gray-level values of arbitrary pixel rows corresponding to the sub-sequence of the window width W=3 have the uniqueness respectively.

The sequence {1,0,0,1,0,1,1,1,0,0,1,0,1,1} can be obtained by repeatedly arranging the sequence {an}={1,0,0,1,0,1,1}. When the last five terms are deleted from the sequence {1,0,0,1,0,1,1,1,0,0,1,0,1,1} such that the same sub-sequence as {1,0,0} which is of the beginning sub-sequence (sub-sequence of the window width W=3) does not emerge, the sequence {1,0,0,1,0,1,1,1,0} can be obtained. The values "1" and "0" of the terms in the sequence are converted into the gray-level values of "150" and "50" respectively, which allows the image data {150,50,50,150,50,150,150,150,50} to be obtained. For the image data {150,50,50,150,50,150,150,150,50}, the directions of the vectors (150,50,50), (50,50,150), (50,150,50), (150,50,150), (50,150,150), (150,150,150), and (150,150,50) expressed by the gray-level values of arbitrary pixel rows corresponding to the sub-sequence of the window width W=3 have the uniqueness respectively. Accordingly, the image data {150,50,50,150,50,150,150,150,50} may be used.

Figure 5:
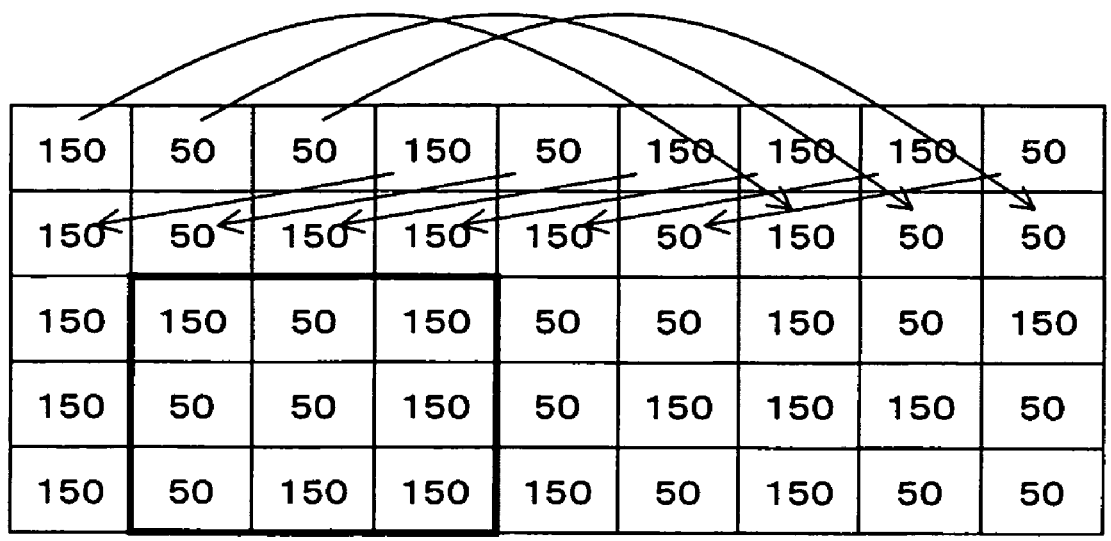
FIG. 5 shows another example of the image data generated by the process shown in the flowchart of FIG. 2.

The image data shown in FIG. 4 can be obtained by directly arranging the one-line image data in the plural columns as described above, the image data shown in FIG. 5 can be obtained by arranging the one-line image data while shifting the one-line image data by the window width W, i.e., by three pixels in the row direction. In the image data of FIG. 5, assuming that the square matrix includes the numbers of row and columns corresponding to the window width W, that is, the square matrix includes three rows and three columns (for example, the matrix surrounded by a have line in FIG. 5), an arbitrary square matrix has no relationship of the scalar multiplication with other square matrixes.

For the sake of convenience, the above description is presented in the case of gray-level bit N=1, i.e., in the case where the pattern gray level is the binary value (two gray levels), so that the vectors in the same direction have the same length. However, in the case where the pattern gray level is at least three, for example, like the vector (50,100,150) and the vector (10,20,30), it can be thought that the two vectors in the same direction have the different lengths (an average of such vectors becomes 0 and the vectors are normalized to values (−1,0,1) whose variance becomes 1, so that the vectors cannot be identified in the normalized correlation method).

The generation of the two vectors which have the same direction while having the different lengths cannot be avoided in the conventional method of generating the random pattern using the random numbers or normal random numbers. However, the generation of the two vectors which have the same direction while having the different lengths can be avoided in the pattern generating apparatus 22.

The sequence $\{a_n\}$ generated by the processes of FIG. 2 had the maximum period under constraint that the direction of the vector has the uniqueness. Therefore, the necessary sequence $\{a_n\}$ can be generated by a less amount of information.

In the processes of FIG. 2, when the beginning W terms of the sequence $\{a_n\}$ generated by setting the initial value $C_1$ of the candidate value at 000 are regarded as the binary numeric value, the numeric value is characterized by always becoming a value (binary value) computed by 2(NW−1) (for example, in the specific example of FIG. 3, N=1 and W=3 lead to 2(N·W−1)=4, i.e., 100 in the binary expression).

Figure 6:
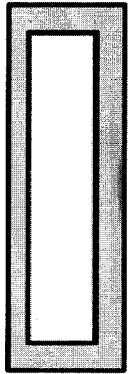
FIG. 6 shows results measured by the three-dimensional shape measuring apparatus of FIG. 1.
Figure 6:
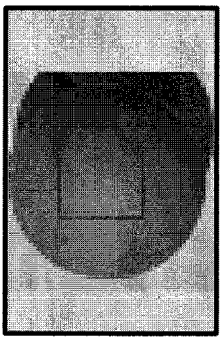
Figure 6:
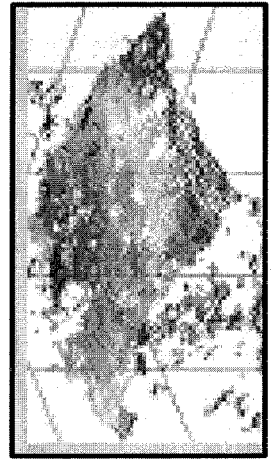
Figure 6:
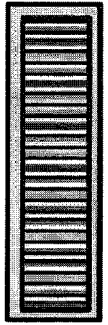
Figure 6:
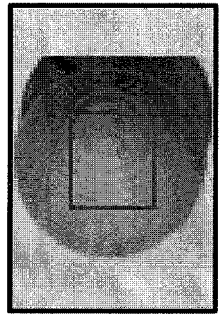
Figure 6:
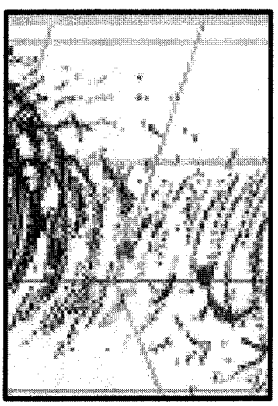
Figure 6:
Figure 6:
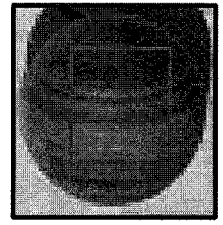
Figure 6:
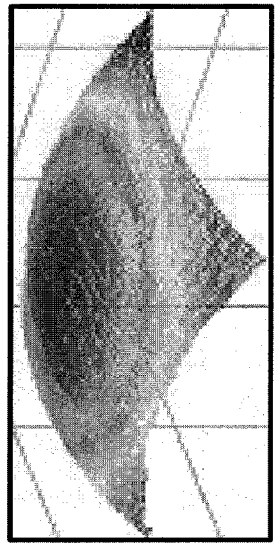

FIG. 6 shows measurement result performed with the three-dimensional shape measuring apparatus 1. For comparison, FIG. 6 also shows the measurement results both in the case where the pattern is not projected and in the case where a strip pattern is projected. A sphere having the even color surface (non-texture surface) is used as the measurement target. The pattern having the gray-level bit N=1 and the window width W=10 is used as the pattern of the first embodiment.

As can be seen from FIG. 6, the correct measurement results are not obtained because the stereo correspondence problem is not properly performed both in the case where the pattern is not projected and in the case where a strip pattern is projected. On the other hand, in the case where the pattern of the first embodiment is used, the correct measurement results can be obtained because the stereo correspondence problem is properly performed.

Figure 7:
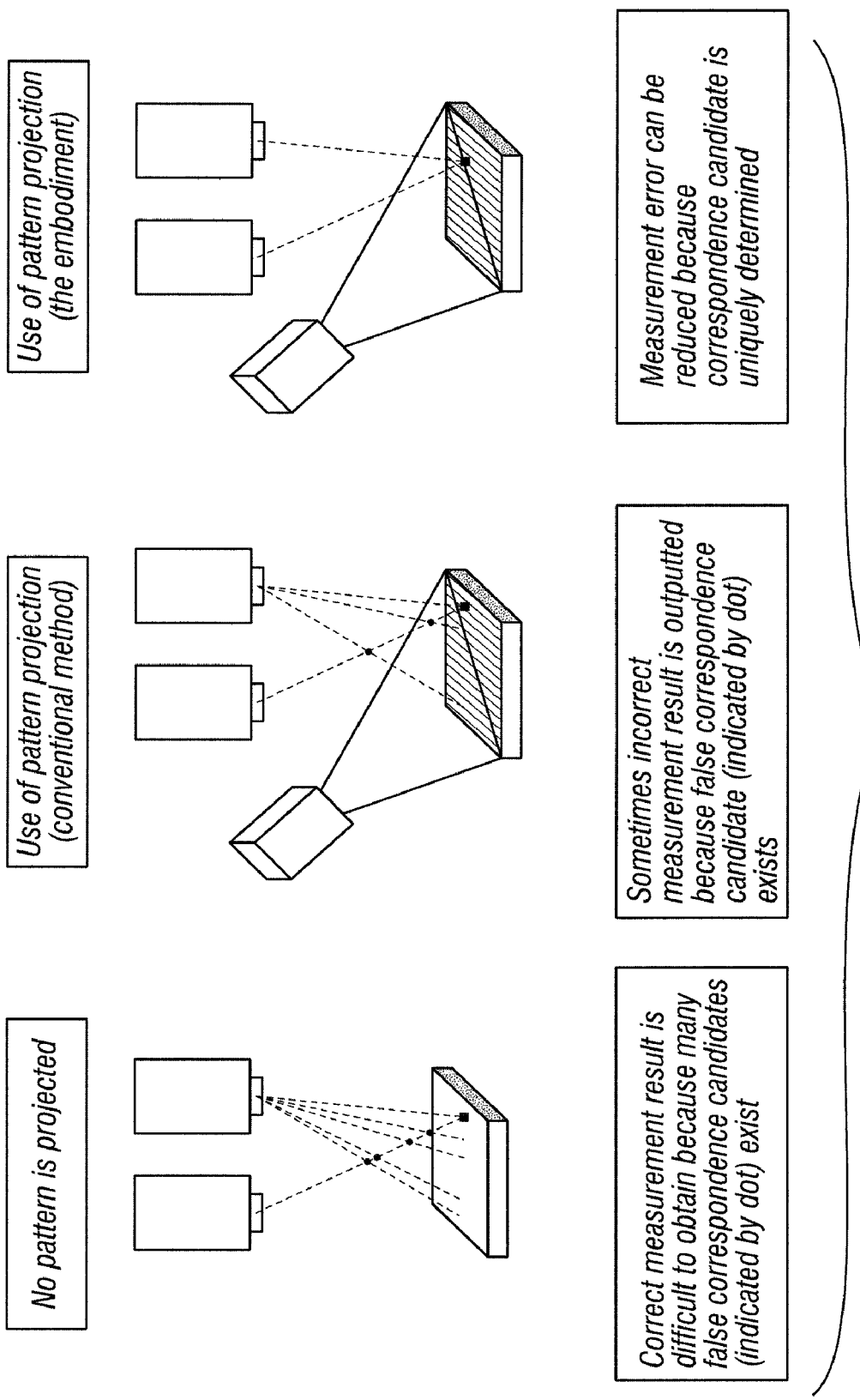
FIG. 7 shows an explanatory view of study of the measurement result of FIG. 6.

As shown in FIG. 7, it is difficult to obtain the correct measurement result, because many false correspondence candidates exist in the case where no pattern is projected. In the case where the stripe pattern is used, there is a risk that the incorrect measurement result is obtained because the false correspondence candidate possibly exists. On the other hand, in the case where the pattern of the first embodiment is used, the incorrect measurement can be avoided because the correspondence candidate can be uniquely focused on.

In the pattern generating apparatus 22, the process of generating the sequence $\{a_n\}$ is not limited to the above-described process. Alternatively, for example, the M-sequence pseudo-random sequence is generated, the pseudo-random sequence is sectioned by the window width W while shifted from the front end by one term, it is sequentially determined whether the direction of the vector formed by the sectioned sequence has the uniqueness, the vector having the uniqueness is left while the vector not having the uniqueness is left, and thereby the sequence $\{a_n\}$ is generated.

Each block of the pattern generating apparatus 22 may be formed by hardware, and each block of the pattern generating apparatus 22 may be realized by software by executing a pattern generating program in computers such as a personal computer.

That is, the pattern generating apparatus 22 can also be realized by the computer including CPU (central processing unit), ROM (read only memory), RAM (random access memory), and a storage device. CPU executes the pattern generating program for realizing each function of the pattern generating apparatus 22. The pattern generating program is stored in ROM. The pattern generating program is loaded into RAM. The pattern generating program and various kinds of data are stored in the storage device.

A program code (executable format program, an intermediate code program, and a source program) of the pattern generating program which is of the software for realizing the functions is recorded in a recording medium such that the computer can read the program code. The recording medium is supplied to the computer, and the computer read the program coded recorded in the recording medium, which allows the object of the invention to be also achieved.

For example, a tape system recording medium such as magnetic tape and cassette tape, a disk system recording medium including magnetic disks such as floppy (registered trademark) disk and a hard disk and optical disks such as CD-ROM, MO, MD, DVD, and CD-R, a card system recording medium such as an IC card (including memory card) and an optical card, and a semiconductor memory system recording medium such as mask ROM, EPROM, EEPROM, and flash ROM can be used as the recording medium.

The pattern generating apparatus 22 is configured to be connectable to a communication network, and the program code may be supplied through the communication network. The communication network is not particularly limited. For example, the Internet, an intranet, an extranet, LAN, ISDN, VAN, a CATV communication network a virtual private network, a public telephone network, a mobile communication network, an satellite communication network, and the like can be utilized as the communication network. A transmission medium constituting the communication network is not particularly limited. For example, cables such as IEEE1394, USB, an electric power line carrier, the cable television line, the telephone line, and an ADSL line, an infrared ray such as IrDA and a remote controller, and wireless such as Bluetooth (registered trademark), 802.11 wireless, HDR, the mobile communication line, the satellite line, and a digital terrestrial network can be utilized as the transmission medium. The invention can also be achieved in the form of a computer data signal embedded in the carrier, and the program code is realized by electronic transmission in the computer data signal.

In the first embodiment, the pattern generating apparatus 22 and the stereo image processing device 12 are independently formed. The same apparatus may have both the functions of the pattern generating apparatus 22 and stereo image processing device 12. For example, the function of the pattern generating apparatus 22 and the function of the stereo image processing device 12 may be realized by software in one computer.

In the three-dimensional shape measuring apparatus 1, when the positional relationship between the first and second cameras 11a and 11b in the stereo camera 11 is already known, the epipolar line can be determined based on the positional relationship. On the other hand, when the positional relationship between the first and second cameras 11a and 11b in the stereo camera 11 is not known, an object (for example, flat plate) whose three-dimensional shape is already known is previously measured as the measurement target before the measurement is performed, and calibration can be performed such that the positional relationship between the first and second cameras 11a and 11b is calculated back from the measurement result.

In the usual calibration, a tool in which the pattern (already-known pattern may not always be known) called calibration target is drawn is used, and the positional relationship between the cameras is determined by taking the calibration target.

On the contrary, in the three-dimensional shape measuring apparatus 1, even if the object taken by the first and second cameras 11a and 11b has the even color surface during the calibration, the stereo correspondence problem is performed by projecting the pattern generated by the pattern generating apparatus 22 to the object when the shape (for example, flat plate) of the object is previously known, and the positional relationship between the first and second cameras 11a and 11b can be calculated back. That is, in the three-dimensional shape measuring apparatus 1, the pattern generated by the pattern generating apparatus 22 can be used as the calibration target.

Figure 8:
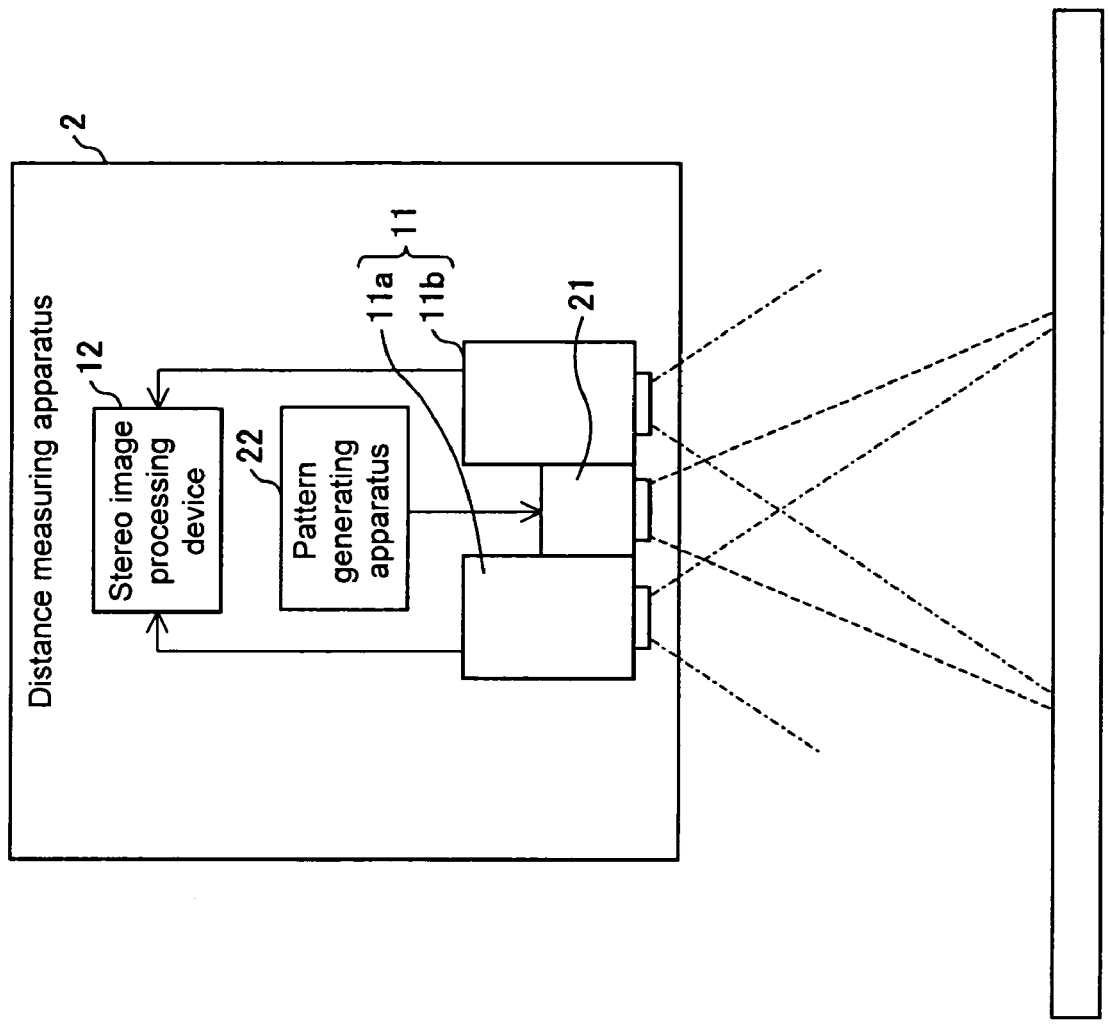
FIG. 8 shows a block diagram of a configuration of a distance measuring apparatus according to the first embodiment of the invention.

As shown in FIG. 8, a distance measuring apparatus 2 can be realized using the stereo camera 11, the stereo image processing device 12, the projector 21, and the pattern generating apparatus 22 which constitute the three-dimensional shape measuring apparatus 1. When the distance measuring apparatus 2 is mounted on an autonomous robot, the distance can appropriately determined even in the case where a wall or a floor has the even color surface, so that autonomous travel can be assisted by providing the proper distance information to the autonomous robot.

Second Embodiment

Figure 9:
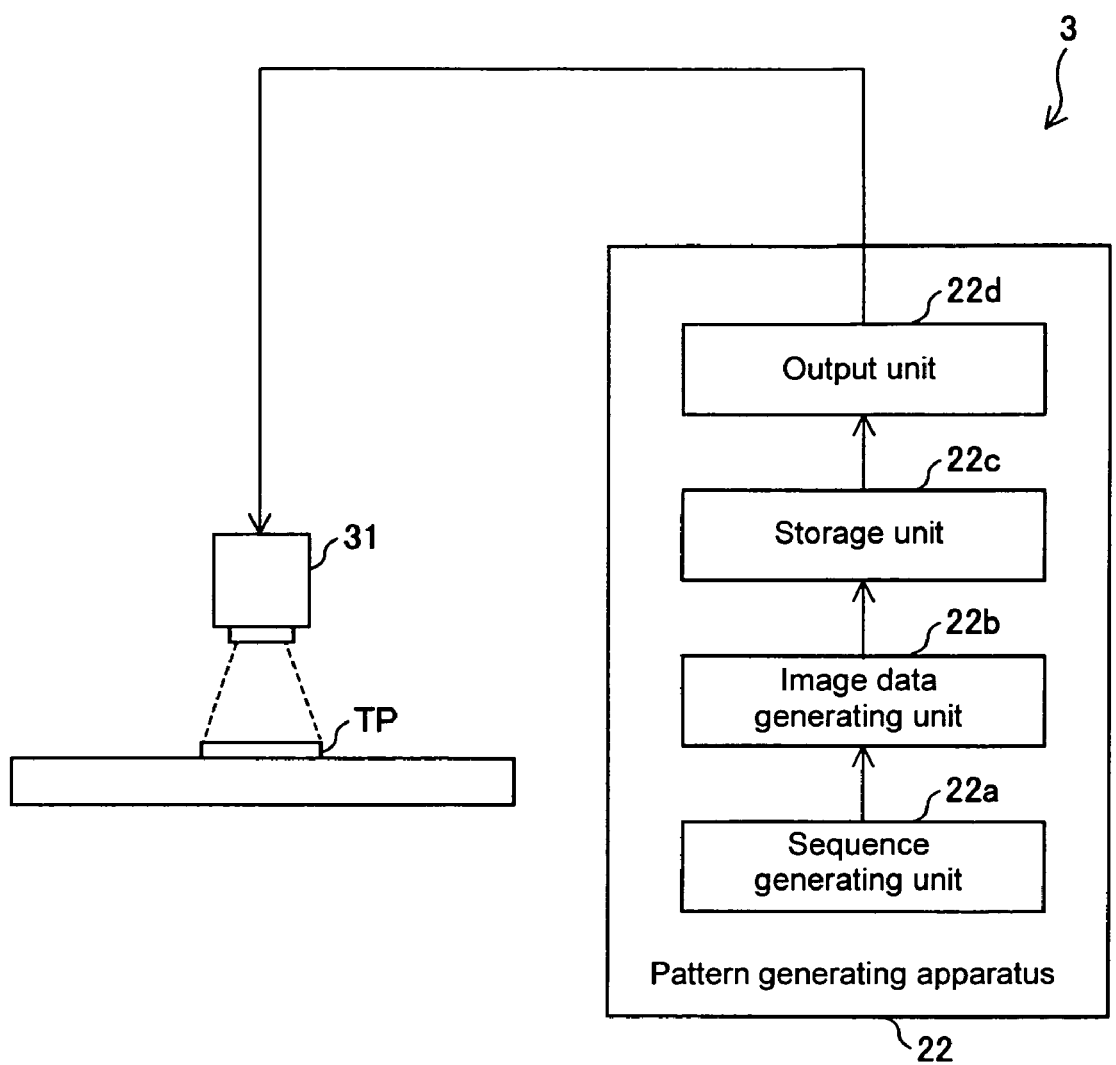
FIG. 9 shows a block diagram of a configuration of a pattern forming apparatus according to a second embodiment of the invention.

A second embodiment of the invention will be described with reference to FIGS. 9 to 11. In a configuration of the second embodiment, the pattern generated by the pattern generating apparatus 22 (see FIG. 1) of the first embodiment is formed in an optical filter, and the pattern is projected using the optical filter.

In the second embodiment, the apparatus, the functional block, and the component having the same functions as those of the first embodiment are designated by the same numerals as those of the first embodiment, and the descriptions will not be repeated.

A configuration of a pattern forming apparatus 3 of the second embodiment will be described below with reference to a block diagram of FIG. 9. The pattern forming apparatus 3 generates the pattern with the pattern generating apparatus 22, and the pattern forming apparatus 3 forms the generated pattern in the optical filter. The pattern forming apparatus 3 includes the pattern generating apparatus 22 and an exposure device 31.

The exposure device 31 outputs an exposure pattern according to the image data generated by the pattern generating apparatus 22. For example, the exposure device 31 is formed by a liquid crystal projector.

A transparent plate TP (such as a film and a glass substrate) in which a photosensitive agent is applied on the surface is exposed by the exposure pattern outputted from the exposure device 31, and the transparent plate TP is developed, which allows the optical filter to be produced.

Figure 10:
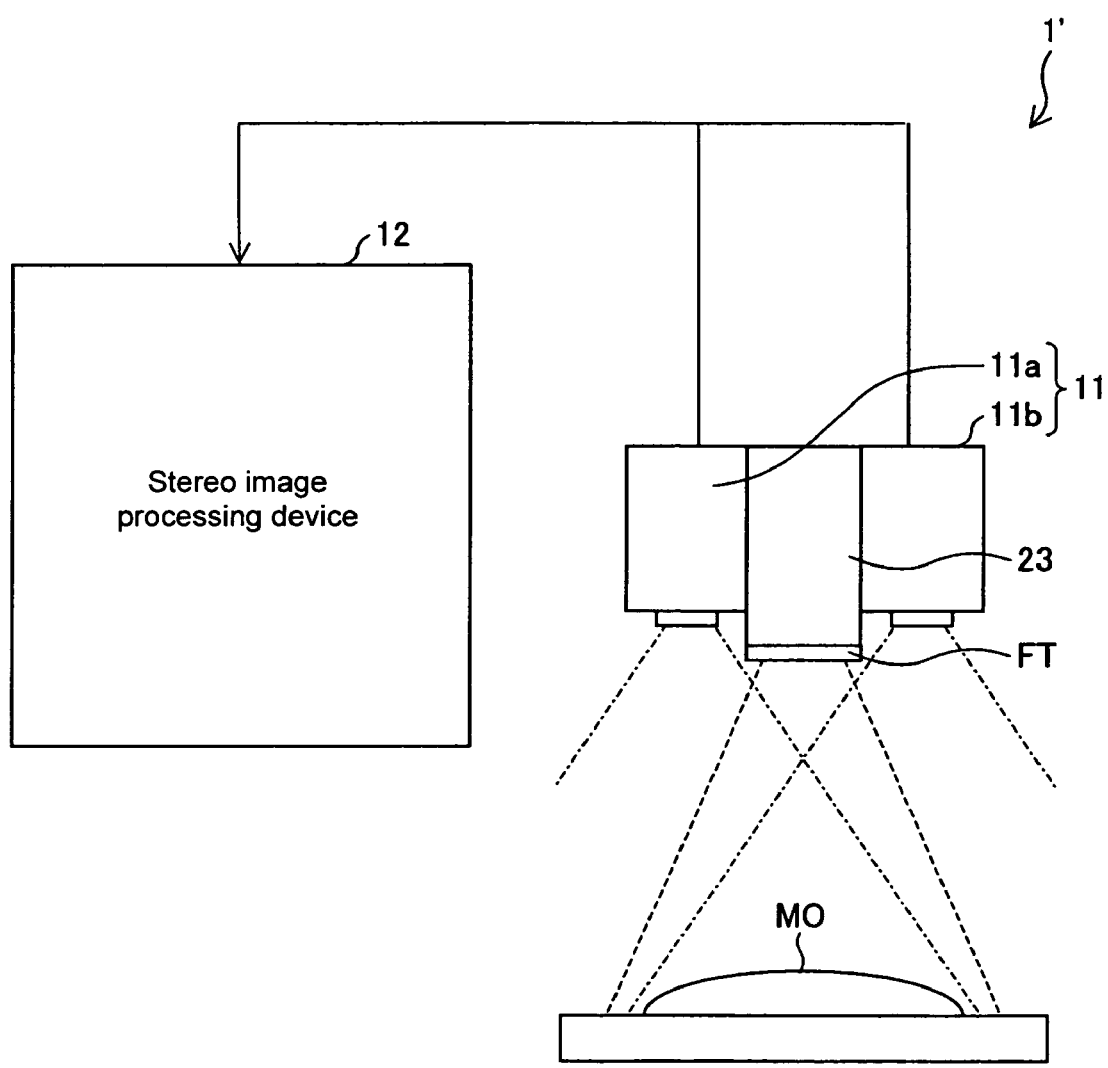
FIG. 10 shows a block diagram of a configuration of a three-dimensional shape measuring apparatus according to the second embodiment of the invention.

FIG. 10 shows a configuration of a three-dimensional shape measuring apparatus 1' in which the optical filter FT (Filter) is used. The three-dimensional shape measuring apparatus 1' includes the stereo camera 11 and the stereo image processing device 12. The three-dimensional shape measuring apparatus 1' also includes a light source 23 and the optical filter FT instead of the projector 21 and the pattern generating apparatus 22 of the three-dimensional shape measuring apparatus 1 (see FIG. 1). In the three-dimensional shape measuring apparatus 1', the same pattern as the three-dimensional shape measuring apparatus 1 is projected to the measurement target MO by controlling the light emitted from the light source 23 with the optical filter FT in which the pattern is formed.

Figure 11:
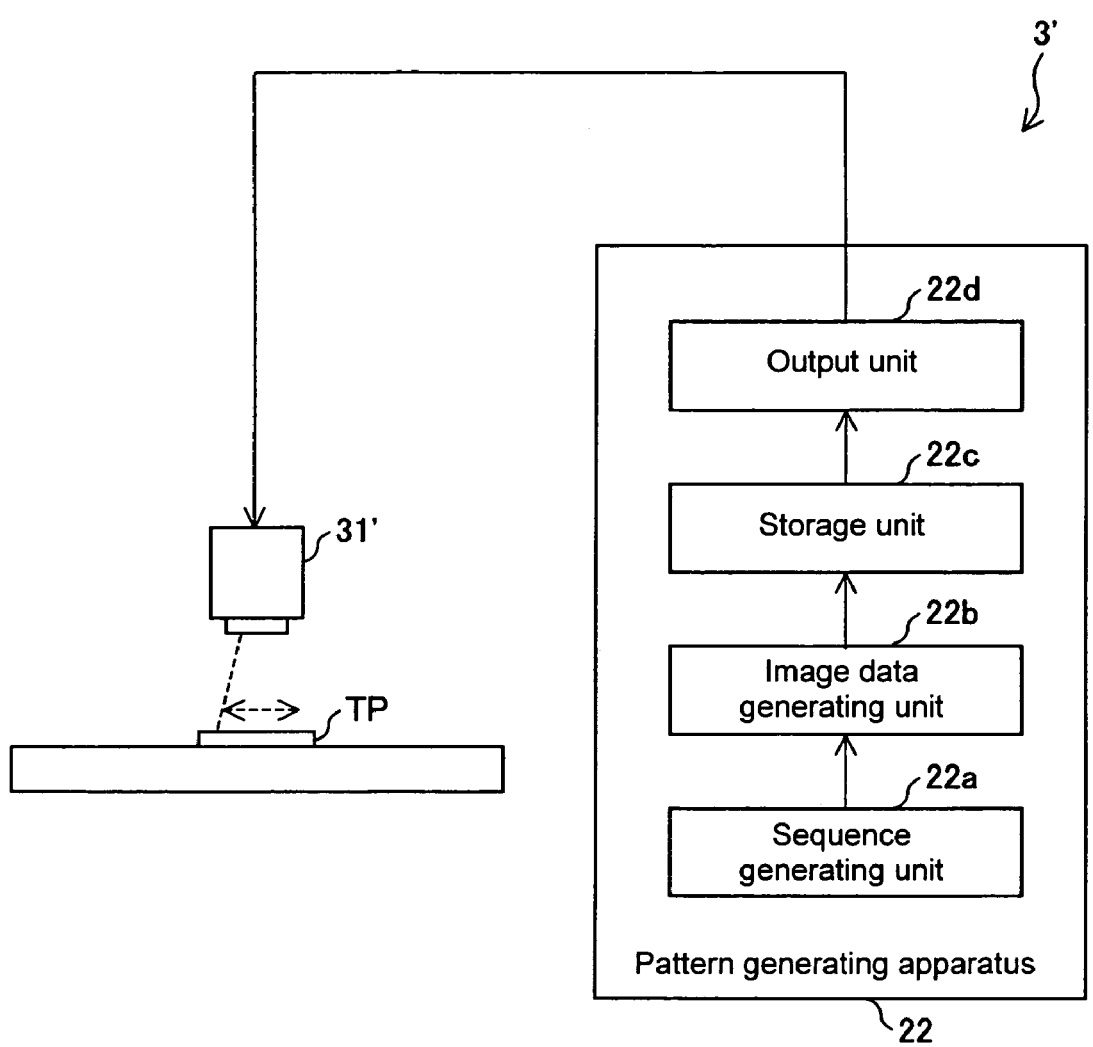
FIG. 11 shows a block diagram of a configuration of another pattern forming apparatus according to the second embodiment of the invention.
Figure 12:
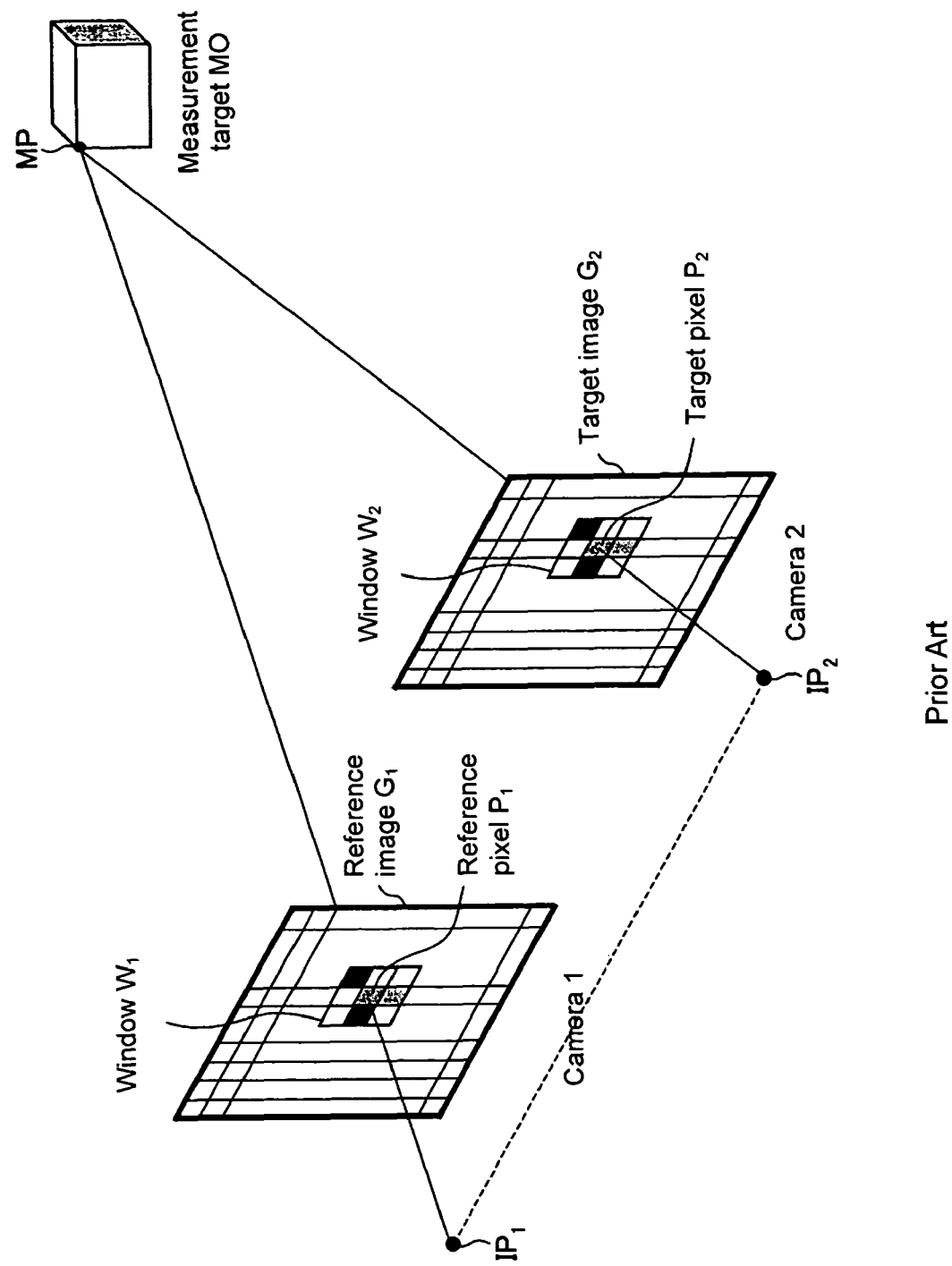
FIG. 12 shows an explanatory view of a concept of stereo correspondence problem.

As shown in FIG. 11, a scanning exposure device 31' may be used as the exposure device constituting the pattern forming apparatus 3. The exposure device 31' scans a laser beam to perform scanning exposure to the transparent plate TP, and the exposure device 31' performs the pattern exposure according to the image data by modulating laser beam intensity based on the image data generated by the pattern generating apparatus 22.

Thus, the image data generated by the pattern generating apparatus 22 is not always outputted as the image unlike in the case where the image data is supplied to the projector 21 or the exposure device 31. As in the case where the image data is supplied to the scanning exposure device 31', any kind of the image data may be used as long as the image can be reproduced in the end.

According to the second embodiment, the pattern generated by the pattern generating apparatus 22 is reproduced on the optical filter FT. Therefore, the three-dimensional shape measuring apparatus 1' can be configured while the pattern generating apparatus 22 is neglected, and the configuration of the three-dimensional shape measuring apparatus 1' can be simplified.

The present invention can particularly preferably applied to the three-dimensional shape measuring apparatus and the distance measuring apparatus.

What is claimed is:

1. A pattern generating apparatus which generates three-dimensional image data of a pattern projected to a target, the pattern generating apparatus comprising:
    a sequence generating device which generates a sequence formed by terms having M-value numeric values; and
    an image data generating device which generates the three-dimensional image data by converting each numeric value of the sequence into a gray-level value according to each numeric value, the sequence being generated by the sequence generating device,
    wherein the sequence generating device generates the sequence such that vectors expressed by sub-sequences have different directions for the sub-sequence constituting the generated sequence, the sub-sequence having a predetermined length.

2. A pattern generating apparatus according to claim 1, wherein the image data generating device sets the sequence, generated by the sequence generating device, at a row while arranging the plurality of rows in a column direction, and thereby the image data generating device generates a matrix image data.

3. A pattern generating apparatus according to claim 1, wherein the image data generating device sets the sequence generated by the sequence generating device, the image data generating device arranges the plurality of rows in a column direction while shifting the row by the predetermined length in a row direction, and thereby the image data generating device generates a matrix image data.

4. A pattern generating apparatus according to claim 1, wherein the M-value is an N-bit numeric value enumerated to the predetermined length and if the N-bit numeric candidate values used to create the sequence are binary values then, the sequence generating device repeatedly performs computation in which the candidate value is multiplied by $2^N$ while a new candidate value is obtained by incrementing the candidate value by 1 within a range of ($2^N-1$) times,
    the sequence generating device confirm whether the vector expressed by the newly obtained candidate value differs from the vector expressed by the previously obtained candidate value in a direction when the candidate value is newly obtained, the sequence generating device adopts the newly obtained candidate value when the vectors differ from each other in the direction, and the sequence generating device generates the sequence by arranging last N bits of the adopted candidate value.

5. A projecting apparatus comprising:

a sequence generating device which generates a sequence such that vectors expressed by sub-sequences have different directions for the sub-sequence constituting the generated sequence, the sub-sequence having a predetermined length, the sequence being formed by terms having M- value numeric values;

an image data generating device which generates three-dimensional image data by converting each numeric value of the sequence into a gray-level value according to each numeric value, the sequence being generated by the sequence generating device; and a projecting device which projects a pattern of the three-dimensional image data generated by the image data generating device to a measurement target.

6. A distance measuring apparatus comprising:

a sequence generating device which generates a sequence such that vectors expressed by sub-sequences have different directions for the sub-sequence constituting the generated sequence, the sub-sequence having a predetermined length, the sequence being formed by terms having M-value numeric values;

an image data generating device which generates three-dimensional image data by converting each numeric value of the sequence into a gray-level value according to each numeric value, the sequence being generated by the sequence generating device;

a projecting device which projects a pattern of the three-dimensional image data generated by the image data generating device to a measurement target; and a stereo imaging device which takes an image of the measurement target.

7. A three-dimensional measuring apparatus comprising:

a sequence generating device which generates a sequence such that vectors expressed by sub-sequences have different directions for the sub-sequence constituting the generated sequence, the sub-sequence having a predetermined length, the sequence being formed by terms having M-value numeric values;

an image data generating device which generates three-dimensional image data by converting each numeric value of the sequence into a gray-level value according to each numeric value, the sequence being generated by the sequence generating device;

a projecting device which projects a pattern of the image data generated by the image data generating device to a measurement target; and a stereo imaging device which takes an image of a measurement target, the pattern being projected to the measurement target by the projecting device.

8. A pattern generating method of generating three-dimensional image data of a pattern projected to a target, the pattern generating method comprising:

a sequence generating process of generating a sequence formed by terms having M-value numeric values; and an image data generating process of generating the three-dimensional image data by converting each numeric value of the sequence into a gray-level value according to each numeric value, the sequence being generated by the sequence generating process, wherein the sequence is generated in the sequence generating process such that vectors expressed by sub-sequences have different directions for the sub-sequence constituting the generated sequence, the sub-sequence having a predetermined length.

9. A non-transitory computer-readable recording medium that stores pattern generating program to operate a computer, comprising:

a sequence generating step of a sequence generating step of generating a sequence such that vectors expressed by sub-sequences have different directions for the sub-sequence constituting the generated sequence, the sub-sequence having a predetermined length, the sequence being formed by terms having M-value numeric values; and an image data generating step of generating image data by converting each numeric value of the sequence into a gray-level value according to each numeric value, the sequence being generated by the sequence generating step.

10. A pattern generating apparatus which generates image data of a pattern projected to a target, the pattern generating apparatus comprising:

a sequence generating device which generates a sequence formed by terms having M-value numeric values; and an image data generating device which generates the image data by converting each numeric value of the sequence into a gray-level value according to each numeric value, the sequence being generated by the sequence generating device, wherein the sequence generating device generates the sequence such that vectors expressed by sub-sequences have different directions for the sub-sequence constituting the generated sequence, the sub-sequence having a predetermined length.

11. A pattern generating apparatus according to claim 10, wherein the image data generating device sets the sequence, generated by the sequence generating device, at a row while arranging the plurality of rows in a column direction, and thereby the image data generating device generates a matrix image data.

12. A pattern generating apparatus according to claim 10, wherein the image data generating device sets the sequence generated by the sequence generating device, the image data generating device arranges the plurality of rows in a column direction while shifting the row by the predetermined length in a row direction, and thereby the image data generating device generates a matrix image data.

13. A pattern generating apparatus according to claim 10, wherein the M-value is an N-bit numeric value enumerated to the predetermined length and if the N-bit numeric candidate values used to create the sequence are binary values then, the sequence generating device repeatedly performs computation in which the candidate value is multiplied by $2^N$ while a new candidate value is obtained by incrementing the candidate value by 1 within a range of $(2^N-1)$ times, the sequence generating device confirm whether the vector expressed by the newly obtained candidate value differs from the vector expressed by the previously obtained candidate value in a direction when the candidate value is newly obtained, the sequence generating device adopts the newly obtained candidate value when the vectors differ from each other in the direction, and the sequence generating device generates the sequence by arranging last N bits of the adopted candidate value.

14. A projecting apparatus comprising:
a sequence generating device which generates a sequence such that vectors expressed by sub-sequences have different directions for the sub-sequence constituting the generated sequence, the sub-sequence having a predetermined length, the sequence being formed by terms having M-value numeric values;
an image data generating device which generates image data by converting each numeric value of the sequence into a gray-level value according to each numeric value, the sequence being generated by the sequence generating device; and
a projecting device which projects a pattern of the image data generated by the image data generating device to a measurement target.

15. A distance measuring apparatus comprising:
a sequence generating device which generates a sequence such that vectors expressed by sub-sequences have different directions for the sub-sequence constituting the generated sequence, the sub-sequence having a predetermined length, the sequence being formed by terms having M-value numeric values;
an image data generating device which generates image data by converting each numeric value of the sequence into a gray-level value according to each numeric value, the sequence being generated by the sequence generating device;
a projecting device which projects a pattern of the image data generated by the image data generating device to a measurement target; and
a stereo imaging device which takes an image of the measurement target.

16. A three-dimensional measuring apparatus comprising:
a sequence generating device which generates a sequence such that vectors expressed by sub-sequences have different directions for the sub-sequence constituting the generated sequence, the sub-sequence having a predetermined length, the sequence being formed by terms having M-value numeric values;
an image data generating device which generates image data by converting each numeric value of the sequence into a gray-level value according to each numeric value, the sequence being generated by the sequence generating device;
a projecting device which projects a pattern of the image data generated by the image data generating device to a measurement target; and
a stereo imaging device which takes an image of a measurement target, the pattern being projected to the measurement target by the projecting device.

17. A pattern generating method of generating image data of a pattern projected to a target, the pattern generating method comprising:
a sequence generating process of generating a sequence formed by terms having M-value numeric values; and
an image data generating process of generating the image data by converting each numeric value of the sequence into a gray-level value according to each numeric value, the sequence being generated by the sequence generating process,
wherein the sequence is generated in the sequence generating process such that vectors expressed by sub-sequences have different directions for the sub-sequence constituting the generated sequence, the sub-sequence having a predetermined length.

18. A computer-readable recording medium that stores pattern generating program to operate a computer, comprising:
a sequence generating step of a sequence generating step of generating a sequence such that vectors expressed by sub-sequences have different directions for the sub-sequence constituting the generated sequence, the sub-sequence having a predetermined length, the sequence being formed by terms having M-value numeric values; and
an image data generating step of generating image data by converting each numeric value of the sequence into a gray-level value according to each numeric value, the sequence being generated by the sequence generating step.

* * * * *